United States Patent [19]

Olstowski et al.

[11] Patent Number: 4,485,032

[45] Date of Patent: Nov. 27, 1984

[54] COMPATIBLE POLYOL BLENDS

[75] Inventors: Franciszek Olstowski, Freeport; Richard D. Peffley, Lake Jackson, both of Tex.

[73] Assignee: The Dow Chemical Company, Midland, Mich.

[21] Appl. No.: 531,109

[22] Filed: Sep. 12, 1983

[51] Int. Cl.$^3$ .......................... C09K 3/00; H05B 33/00
[52] U.S. Cl. .................................. 252/182; 568/624; 560/158
[58] Field of Search ........................ 252/182; 568/624; 560/158

[56] References Cited

U.S. PATENT DOCUMENTS

| | | | |
|---|---|---|---|
| 3,929,730 | 12/1975 | Graefe et al. | 528/83 |
| 3,993,576 | 11/1976 | Barron | 252/182 |
| 4,008,185 | 2/1977 | Olstowski | 521/163 |
| 4,273,884 | 6/1981 | Dominquez | 521/114 |
| 4,310,436 | 1/1982 | Camp | 568/624 |

*Primary Examiner*—John Kight
*Assistant Examiner*—Nathan M. Nutter
*Attorney, Agent, or Firm*—J. G. Carter

[57] ABSTRACT

Compositions containing a relatively high molecular weight polyol and ethylene glycol which compositions are incompatible, i.e. separate into two distinct phases upon storage, are compatibilized by the admixture therewith of urea or a substituted urea.

10 Claims, No Drawings

COMPATIBLE POLYOL BLENDS

BACKGROUND OF THE INVENTION

The present invention pertains to compatible blends containing a relatively high molecular weight polyol and a relatively low molecular weight polyol containing primary hydroxyl groups.

Polyurethane articles, commonly formed by the RIM (Reaction Injection Molding) process, are polymer products resulting from the reaction of liquid polyol mixtures and liquid polyisocyanates. These rapid polymerization processes commonly employ a blend of low equivalent weight glycols such as ethylene glycol or 1,4 butanediol and primary hydroxyl terminated high molecular weight polyether polyols. Such blends of ethylene glycol and a 5000 mol. wt. primary capped polyether polyol are incompatible fluids that tend to separate into layers on standing.

Recognition of this effect dictates that these blends should be constantly agitated to avoid a misformulation by the separation of components or in some cases, additively, a tendency for catalyst migration occurs in these blends that also contain a heavy metal catalyst such as organotin compound. Further, in certain instances, agitation of these fluid blends during storage or shipment or transfer is not practical or may be difficult.

U.S. Pat. No. 3,929,730 teaches the use of 1,4 butanediol as a "chain extender" that is blended with high molecular weight polyols (about 2000 m.w. or greater) to prepare polyurethane compositions. However, 1,4 butane diol is insoluble in polyol at the concentration usually employed (see lines 60–70, col. 1 and part C or claim 1). A sufficient amount of phenylenediethanolamine is used to render the mixture soluble in the polyol.

U.S. Pat. No. 3,993,576 teaches a composition resistant to phase separations (in the mixture of high mol. wt. polyols and low mol. wt. polyols) by the addition of a "solubilizer", a derivative of butylene glycol or propylene glycol.

U.S. Pat. No. 4,008,185 teaches the use of urea as a catalytic modifier for preparing rapid-setting polyurethanes by reacting a polyol free from nitrogen groups or a mixture of such polyols having from 2 to about 8 hydroxyl groups per molecule and an OH equivalent weight from about 30 to about 500 and an aromatic polyisocyanate. However, urea failed to catalyze the reaction of polyols having an equivalent weight of 500 or higher with aromatic isocyanates.

The solubilizing agent in U.S. Pat. No. 3,929,730 is a substituted ethanolamine and the solubilizing agent in U.S. Pat. No. 3,993,576 is a polyol derivative of butylene or propylene glycol. We disclose solubilizing agents within the group of urea and/or substituted urea's that contain no hydroxyl groups or other active hydrogen groups capable of reacting with isocyanates under conventional RIM reaction conditions. Such compounds as diethanol urea dissolved in ethylene glycol failed to compatibilize blends of ethylene glycol and high molecular weight primary hydroxyl terminated polyols compared to the use of urea. We find that the hydrogen atoms bonded to the nitrogen atoms in ureas or substituted urea's exhibit no significant reactivity with isocyanates under RIM reaction conditions. The substituted urea's, further, must also be free of reactive groups capable of reacting with hydroxyls or amines.

We have discovered that the addition of a minor amount of urea and/or substituted urea's to the incompatible polyol blends renders these mixtures into a compatible or single phase liquid. These blends of low equivalent weight glycol and high equivalent weight primary capped polyol that have been compatibilized by the addition of minor amounts of urea and/or substituted urea's and may also contain an organotin compound as a catlyst show no significant loss in reactivity after standing.

We have further discovered that such urea and/or substituted urea compatibilized blends of low equivalent weight polyols such as ethylene glycol and/or 1,4 butane diol and high molecular weight primary capped polyols (equivalent weight of about 1000 or greater) where the high mol. wt. polyol is the major weight function of the hydroxyl components is RIM reactive in the absence of any organo metal (i.e. Sn carboxylate etc.) or amine catalyst. In other words, the compatibilized polyol blends mentioned above are catalyzed to react with polyisocyanates by the presence of urea and selected substituted ureas as the sole catalyst.

SUMMARY OF THE INVENTION

One aspect of the present invention pertains to a compatible mixture comprising
(A) a normally incompatible mixture comprising
(1) at least one relatively high molecular weight polyol having an average hydroxyl functionality of from about 2 to about 4, preferably from about 2 to about 3, and an average molecular weight of at least about 1000, preferably from about 2000 to about 8000, and with at least about 30 percent, preferably from about 50 to about 100 percent of the hydroxyl groups being primary hydroxyl groups; and
(2) at least one relatively low molecular weight polyol having an average hydroxyl functionality of from about 2 to about 6, preferably from about 2 to about 4; a molecular weight of less than about 1000, preferably from about 60 to about 600;
(B) at least one material which is either a liquid or a solid having a melting point not greater than about 200° C. which material is represented by the formula

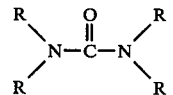

wherein each R is independently hydrogen or a hydrocarbyl group having a sufficient number of carbon atoms such that the molecular weight of such group is not greater than about 400, preferably less than about 200; said material being present in a quantity sufficient to maintain the composition in a single liquid phase for at least about 5 days at about 25° C. without causing gellation.

The term incompatible as employed herein means that the composition upon storage at a temperature of about 25° C. for about 5 days forms at least two distinct layers. The term compatible means that the mixture remains a single phase at a temperature of about 25° C. for greater than 5 days.

DETAILED DESCRIPTION OF THE INVENTION

Suitable relatively high molecular weight materials which can be employed herein include those materials which are prepared by reacting a vicinal epoxy-containing compound with an initiator material having from 2 to about 8, preferably from about 2 to about 4 hydroxyl groups per molecule.

Particularly suitable initiator materials include, for example, water, ethylene glycol, propylene glycol, glycerine, trimethylolpropane, pentaerythritol, sorbitol, sucrose, mixtures thereof and the like.

Suitable relatively high molecular weight polyols particularly includes the reaction product of a vicinal epoxy-containing compound with the aforementioned initiator materials which reaction product has been subsequently modified so as to contain primary hydroxyl groups such as by reacting the resultant reaction product with ethylene oxide to the extent that the product contains at least about 10, preferably at least about 14 weight percent oxyethylene groups.

Suitable such vicinal epoxy-containing compounds include, for example, propylene oxide, 1,2-butylene oxide, 2,3-butylene oxide, styrene oxide, epichlorohydrin, epibromohydrin, epiiodohydrin, methylepichlorohydrin, mixtures thereof and the like.

Suitable materials which can be employed herein as relatively low molecular weight polyols include, for example, ethylene glycol, diethylene glycol, propylene glycol, 1,4-butanediol, 1,5-pentanediol, 1,6-hexanediol.

Suitable compatibilizing agents which can be employed herein include, for example, urea, dimethyl urea, phenyl urea, diallyl urea, tetramethyl urea, mixtures thereof and the like.

The following examples are illustrative of the present invention but are not to be construed as to limiting the invention in any manner.

The following components were employed in the examples.

RHMW POLYOL A was a polyol prepared by reacting glycerine with propylene oxide and subsequently end-capping with about 18 weight percent ethylene oxide and having about 77% primary hydroxyl groups and an average hydroxyl equivalent weight of about 1650.

RHMW POLYOL B was a mixture of about 93 weight percent RHMW Polyol A and about 7 weight percent of an aminated polyoxypropylene glycol having an average molecular weight of about 400. The aminated polyol is commercially available from Texaco Chemical as Jeffamine D-400.

RHMW POLYOL C was a polyol prepared by reacting glycerine with propylene oxide and subsequently end-capping with about 14 weight percent ethylene oxide and having about 70% primary hydroxyl groups and an average hydroxyl equivalent weight of about 1640.

RLMW POLYOL A was ethylene glycol.

RHMW POLYOL D was blend of 60 weight percent of a capped polyether diol based on poly(propylene oxide) diol of about 4000 molecular weight and capped with about 18 wt.% ethylene oxide and 40 wt.% of a polyether triol of approximately 5000 molecular weight (based on propylene oxide) with about 18 wt.% ethylene oxide capping.

EXAMPLE 1

A series of formulations were prepared by blending various quantities of urea into ethylene glycol and then adding various quantities of these blends into a relatively high molecular weight polyol. The ethylene glycol urea compositions containing less than about 35 weight percent urea were blended at room temperature. Those containing greater than about 35 weight percent urea required elevated temperatures to effect total dissolution of the urea into the ethylene glycol.

The mixtures of ethylene glycol/urea solutions are relatively high molecular weight polyol were then blended at room temperature to evaluate whether a given ratio (parts by weight) of these components would yield an incompatible blend, or a compatible liquid blend, or a gelled mixture. Generally, the result was evident within a few minutes of mixing at room temperature. However some ratios of these components appeared to yield a border line result and storage of these samples at room temperature for about 5 days showed a separation of liquid layers for the incompatible compositions or finally showed a gelled product for those compositions that were slow to gel.

For any given ratio of ethylene glycol to the relatively high molecular weight polyol the incompatible fluid blend indicates that an insufficient amount of urea was employed whereas the gelled product indicates that an excess of urea was employed at that particular ethylene glycol to relatively high molecular weight polyol ratio.

Further, the gelled compositions of ethylene glycol and relatively high molecular weight polyols were only observed when urea was employed as the compatibilizing agent; the use of substituted ureas a compatibilizing agents were not found to yield gelled products at any concentration employed.

TABLE I

| COMPO-SITION NUMBER | RHMW POLYOL type/pbw[1] | ETHYLENE GLYCOL pbw | UREA pbw | REMARKS |
| --- | --- | --- | --- | --- |
| 1[2] | B/100 | 10 | 0.5 | Incompatible |
| 2[3] | B/100 | 10 | 2 | Compatible |
| 3[2] | B/100 | 10 | 5 | Gelled |
| 4[2] | B/100 | 20 | 2 | Incompatible |
| 5[3] | B/100 | 20 | 4 | Compatible |
| 6[3] | B/100 | 20 | 6 | Compatible |
| 7[3] | B/100 | 20 | 7 | Compatible |
| 8[2] | B/100 | 20 | 10 | Gelled |
| 9[2] | B/100 | 30 | 3 | Incompatible |
| 10[3] | B/100 | 30 | 6.5 | Compatible |
| 11[3] | B/100 | 30 | 7.5 | Compatible |
| 12[3] | B/100 | 30 | 10 | Compatible |
| 13[2] | B/100 | 30 | 15 | Gelled |
| 14[2] | B/100 | 40 | 4 | Incompatible |
| 15[3] | B/100 | 40 | 9 | Compatible |
| 16[3] | B/100 | 40 | 10 | Compatible |
| 17[3] | B/100 | 40 | 13 | Compatible |
| 18[2] | B/100 | 40 | 20 | Gelled |
| 19[2] | C/100 | 0.6 | 0.4 | Gelled |
| 20[2] | C/100 | 5 | 0 | Compatible |
| 21[2] | C/100 | 6 | 4 | Gelled |
| 22[3] | C/100 | 8 | 2 | Compatible |
| 23[2] | C/100 | 8 | 3.1 | Gelled |
| 24[2] | C/100 | 8.6 | 1.4 | Incompatible |
| 25[2] | C/100 | 10 | 0 | Incompatible |
| 26[3] | C/100 | 15 | 5 | Compatible |
| 27[2] | C/100 | 16 | 3 | Incompatible |
| 28[2] | C/100 | 17.2 | 2.8 | Incompatible |
| 29[2] | C/100 | 17.5 | 7.5 | Gelled |
| 30[3] | C/100 | 22.5 | 7.5 | Compatible |
| 31[2] | C/100 | 25.8 | 4.2 | Incompatible |
| 32[2] | C/100 | 40 | 10 | Incompatible |

TABLE I-continued

| COMPO-SITION NUMBER | RHMW POLYOL type/pbw[1] | ETHYLENE GLYCOL pbw | UREA pbw | REMARKS |
|---|---|---|---|---|
| 33[2] | C/100 | 46.6 | 20 | Gelled |
| 34[2] | C/100 | 65 | 35 | Gelled |
| 35[2] | C/100 | 70 | 30 | Gelled |
| 36[2] | C/100 | 97 | 52 | Gelled |

Footnotes to Table I
[1] pbw = parts by weight
[2] comparative experiment
[3] example of the present invention

EXAMPLE 2

To a stirred polyol holding tank was added 100 lbs. (45.36 kg) of Polyol B. Next, a pre-dissolved blend of 3 lbs. (1.36 kg) urea in 18 lbs. (8.16 kg) ethylene glycol was added to the same tank and stirred in. This concentration of urea was the minimum required for compatibilizing this polyol blend. Finally, 0.2 wt.% organo-tin catalyst (Fomrez UL-28 commercially available from Witco Chemical Co.) and 0.1 wt% Dabco 33LV (triethylene diamine, 33% in dipropylene glycol) were blended into the same tank. The above mentioned polyol holding tank was an integral part of an Admiral 400-2HP (impingement mixing) RIM processing machine feeding a sheet forming mold clamped in a press.

The isocyanate holding tank of this RIM processing machine contained a liquid MDI prepolymer isocyanate (Upjohn Code 114) having an isocyanate equivalent weight of 160. The feed pumps on this RIM processing machine were set to deliver a mass ratio of 1.04 lbs. polyol per lb. of isocyanate (Note: The dissolved urea was calculated to exhibit no active hydrogens).

The sheet forming mold, designed to form polymer sheets having the dimensions of 12.25 inches (31.16 cm) by 14.75 inches (37.47 cm) by 0.125 inches (0.3175 cm) thick was preheated to about 170° F. (76.7° C.). This sheet mold fed by the impingement mixed polyol and polyisocyanate streams of the RIM processing machine for a reactive fluid blend flow time of 1.5 seconds was opened in about 60 seconds after liquid reactant injection to yield a urethane polymer sheet having essentially the dimensions of the mold cavity. Demolded sheets from this RIM processing machine were then subjected to a post-cure by exposure to a 265° F. (129.4° C.) oven for a total residence time of 30 minutes (1800 s) to complete the cure of these polymer sheets. The properties determined on these sheets are reported in Table II.

TABLE II

| Property | Method | Value |
|---|---|---|
| Tensile strength | ASTM 412-68 | 3692 psi (25456 kPa) |
| Elongation | ASTM 412-68 | 280% |
| Flexural Modulus | ASTM D-790 | 38206 psi (263423 kPa) |
| Tear Resistance | ASTM D-624-70 | 580 pli (104 kg/cm) |
| Shore D Hardness | Shore durometer | 60 |
| Specific Gravity | — | 0.96 g/cc |

EXAMPLE 3

To test the storage stability of the following polyol blend, 12 lbs. (5.4 kg) of urea was pre-dissolved in 54 lbs. (24.5 kg) of ethylene glycol and this mixture was then blended with 300 lbs. (136 kg) of RHMW Polyol B in a 55 gallon (208 l) drum. This drum was left standing for 3 weeks (1814400 s) at room temperature (27° C.). At the end of this period, the drum contents were examined for component separation or signs of incompatibility. The polyol blend was found to be a clear single phase fluid with no sign of incompatibility. The polyol holding tank of the Admiral 400-2HP processing machine was filled with 122 lbs. (55.3 kg) of polyol blend from the stored 55 gallon (208 l) drum. Next, 0.1 wt.% UL-28 and 0.1 wt.% DABCO 33LV (based on polyol tank contents) were charged and blended in the polyol holding tank.

The isocyanate holding tank on this machine was charged with a liquid MDI isocyanate (Upjohn Isonate 143L) and the feed pumps of this machine were set to deliver a mass ratio of 1.23 pbw (parts by weight) polyol blend per pbw of liquid isocyanate.

Using the same sheet forming mold described in the previous example and having the mold temperature set at 170° F. (76.7° C.), the impingement mixed blend of polyols and polyisocyanates was flowed into the mold for a "shot time" of 1.6 seconds. Solid urethane polymer sheets were removed from the mold in 60 seconds after injection of the reactive fluid mix. The demolded polymer sheets from this run were subjected to a post-cure treatment identical to that described in the previous example. The physical properties determined on these post-cured polymer sheets are shown in Table III.

TABLE III

| Property | Value |
|---|---|
| Tensile Strength | 3387 psi (23353 kPa) |
| Elongation | 238% |
| Flexural Modulus | 32552 psi (224440 kPa) |
| Tear Resistance | 534 pli (95.4 kg/cm) |
| Shore D Hardness | 57 |
| Specific Gravity | 0.98 g/cc |

EXAMPLE 4

Urea was pre-dissolved in ethylene glycol in the ratio of 4 pbw urea per 18 pbw ethylene glycol then 22 pbw of this mixture was blended with 100 pbw of RHMW Polyol B in the RIM processing machine polyol tank. No tin or amine catalyst was added to the polyol blend. The isocyanate holding tank on this RIM machine was charged with Isonate 143L. Next, the feed pumps on the RIM machine were set to feed a mass ratio of 1.17 pbw of polyol per pbw of isocyanate (equivalent to approximately 1.03 NCO equivalents/OH equivalents). When the sheet forming mold reached a temperature of about 173° F. (78.3° C.), the impingement mixed reactive fluid blend was injected into the mold and 60 seconds later, a solid urethane polymer sheet was removed from the mold. During the demolding of this polyurethane product seemed to be only slightly less than the tin and amine catalyzed product of the previous run. The apparent slight reduction in demold stiffness of the urea catalyzed product exhibited no detrimental property loss as shown in Table IV (after post curing the sheets in the manner identical with the previous examples). Further, comparative properties of the polymer sheets not subjected to the post cure process are also shown in Table IV.

TABLE IV

| Property | Post Cured @ 265° F. for 30 min. | Not Post Cured |
|---|---|---|
| Tensile Strength | 3260 psi (22477 kPa) | 3135 psi (21615 kPa) |
| Elongation | 242% | 206% |
| Flexural Modulus | 32,734 psi (225,694 kPa) | 34,689 psi (239,174 kPa) |

TABLE IV-continued

| Property | Post Cured @ 265° F. for 30 min. | Not Post Cured |
|---|---|---|
| Tear Resistance | 634 pli (113 kg/cm) | 618 pli (110 kg/cm) |
| Shore D Hardness | 59 | 63 |
| Specific Gravity | 1.11 g/cc | 1.10 g/cc |

At the end of the run, a polyol blend retain sample was removed from the polyol holding tank. This sample was a crystal clear liquid blend that showed no evidence of separation of components over the next month of observations.

EXAMPLE 5

Using the same ratio of urea dissolved in the ethylene glycol preblend (4 pbw urea in 18 pbw ethylene glycol) as in Example 4, 29.34 lbs. (13.31 kg) of this blend was added to and blended with 100 lbs. (45.36 kg) of RHMW Polyol C charged to the polyol holding tank of the RIM processing machine. Again, as in the previous run, no tin or amine or other catalyst was added to either reactive stream of this run. The isocyanate holding tank of the RIM machine was charged with a liquid MDI (Isonate 143L) having an isocyanate equivalent weight of 144. Next the feed pumps on the machine were set to deliver a mass ratio 0.963 pbw of polyol blend per pbw of isocyanate (equivalent to an NCO equivalent/OH equivalent of 1.03). With the sheet forming mold set at a temperature of 170° F. (76.7° C.), a 1.75 second shot time of impingement mixed reactive blend of polyol and polyisocyanate was required to fill the mold. Then 60 seconds later the mold was opened to yield a RIM formed polyurethane polymer sheet exhibiting a noticeable increase in sheet stiffness at demold. The properties of the post cured polymer sheets formed in this run are shown in Table V.

TABLE V

| Property | Value |
|---|---|
| Tensile Strength | 3266 psi (22,518 kPa) |
| Elongation | 210% |
| Flexural Modlus | 60,853 psi (419,569 kPa) |
| Tear Resistance | 684 pli (122 kg/cm) |
| Shore D Hardness | 65 units |
| Specific Gravity | 1.02 g/cc |

EXAMPLE 6

The following components were blended in a vessel at 60° C.:

| | |
|---|---|
| Ethylene Glycol | 13 parts by weight |
| Jeffamine D400 [amine terminated 400 mw poly(propylene oxide)diol] | 5 parts by weight |
| Crude 2,4 Bis(p-aminobenzyl)aniline mixed amine product (72–76° C. melting point) | 5 parts |
| Urea | 2 parts |

Next, 25 pbw of this ethylene glycol, amine, urea blend was added to 100 pbw of RHMW Polyol D to form a non-separating compatible polyol blend which in turn was added to the RIM machine polyol holding tank. The isocyanate holdink tank contained a liquid MDI isocyanate having an approximate isocyanate equivalent weight of 144. No other catalytic agent was added to either reactive component. Then the feed pumps on the machine were adjusted to deliver a mass ratio of 1.50 pbw of polyol blend per pbw of isocyanate.

When the sheet foaming mold reached about 170° F. (76.7° C.), the impingement mixed reactants were fed to the mold at a shot time of 1.95 seconds to fill the mold. These sheets that were removed from the mold in about 60 seconds after mold filling exhibited hair cracks on a folded over corner immediately after removing the sheet from the mold. Those polymer sheets that were removed from the mold in about 120 seconds after mold filling showed a virtual elimination of the hair cracks on a folded over corner of the demolded sheet.

Polymer sheets that were demolded in 120 seconds were further post cured in a 265° F. (129° C.) oven for 30 minutes (1800 s) and then subjected to the property determinations indicated in Table VI.

TABLE VI

| Property | Value |
|---|---|
| Tensile Strength | 2900 psi (19995 kPa) |
| Elongation | 232% |
| Flexural Modulus | 30,383 psi (209485 kPa) |
| Tear Resistance | 634 pli (113 kg/cm) |
| Shore D Hardness | 58 |
| Specific Gravity | 1.12 g/cc |

EXAMPLE 7

In a vessel containing 20 pounds (9.07 kg) of 1,4 butanediol was added 5 pounds (2.27 kg) of dimethyl urea crystals and dissolved. Then this blend was added to 100 pounds (45.36 kg) of RHMW Polyol A contained within the stirred polyol holding tank of the RIM machine to form a compatible single phase fluid. The isocyanate holding tank of this RIM processing machine contained a liquid modified 4,4'diphenylmethane diisocyanate having an isocyanate equivalent weight of 144. Then the feed pumps on this machine were set to deliver a mass ratio of 1.67 pbw of polyol blend per pbw of liquid isocyanate. In this case the dimethyl urea was calculated to exhibit no active hydrogens. The sheet forming mold was preheated to 180° F. (82.2° C.) and the shot time for the impingement mixed streams of polyol blend and isocyanate was set at 2.15 seconds duration for filling the sheet mold. Urethane polymer sheets were removed from the mold after a 60 second residence time after the liquid injection process.

After a sufficient quantity of polymer sheets were formed, approximately 0.1 wt.% of an organotin catalyst (UL-28) was added to the polyol tank and stirred in the polyol blend. Next, another series of RIM formed sheets were prepared under the same conditions except that these sheets were formed in the presence of a supplemental catalyst. Both sets of low flexural modulus elastomeric sheets were subjected to a post cure process in an oven set at 265° F. (129.5° C.) for 30 minutes (1800 s) to complete the cure of these sheets. The properties determined on these sheets are reported in Table VII.

TABLE VII

| Property | Without Sn Catalyst | With 0.1 Wt. % Sn Catalyst |
|---|---|---|
| Tensile Strength | 1763 psi (12,156 kPa) | 2067 psi (14,252 kPa) |
| Elongation | 204% | 222% |
| Flexural Modulus | 4639 psi (31,985 kPa) | 7346 psi (50,649 kPa) |
| Tear Resistance | 239 pli (43 kg/cm) | 352 pli (63 kg/cm) |
| Shore A Hardness | 88 | 93 |

TABLE VII-continued

| Property | Without Sn Catalyst | With 0.1 Wt. % Sn Catalyst |
|---|---|---|
| Specific Gravity | 1.04 g/cc | 1.10 g/cc |

We claim:
1. A compatible mixture comprising
(A) a normally incompatible mixture comprising
   (1) at least one relatively high molecular weight polyol having an average hydroxyl functionality of from about 2 to about 4; an average molecular weight of at least about 1000; and with at least about 30 percent, of the hydroxyl groups being primary hydroxyl groups;
   (2) at least one relatively low molecular weight polyol having an average hydroxyl functionality of from about 2 to about 6; a molecular weight of less than about 1000;
(B) at least one material which is either a liquid or a solid having a melting point not greater than about 200° C. which material is represented by the formula

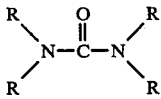

wherein each R is independently hydrogen or a hydrocarbyl group having a sufficient number of carbon atoms such that the molecular weight of such group is not greater than about 400; said material being present in a quantity sufficient to maintain the composition in a single liquid phase for at least about 5 days at about 25° C. without causing gellation.

2. A compatible mixture of claim 1 wherein Component (A-1) has an average hydroxyl functionality of from about 2 to about 3; an average molecular weight of from about 2000 to about 8000; Component (A-2) has an average hydroxyl functionality of from about 2 to about 4 and an average molecular weight of from about 60 to about 600.

3. A compatible mixture of claim 2 wherein Component (A-1) has an average hydroxyl functionality of about 3 and contains at least about 10 weight percent terminal oxyethylene groups.

4. A compatible mixture of claim 3 wherein Component (A-1) is a glycerine initiated polyoxypropylene glycol containing at least about 14 weight percent terminal oxyethylene groups and Component (A-2) is ethylene glycol.

5. A compatible mixture of claim 4 wherein said compatible mixture contains a minor amount of a primary amine-containing material.

6. A compatible mixture of claim 1 wherein Component (B) is urea or dimethyl urea.

7. A compatible mixture of claim 2 wherein Component (B) is urea or dimethyl urea.

8. A compatible mixture of claim 3 wherein Component (B) is urea or dimethyl urea.

9. A compatible mixture of claim 4 wherein Component (B) is urea or dimethyl urea.

10. A compatible mixture of claim 5 wherein Component (B) is urea or dimethyl urea.

* * * * *